(12) United States Patent
Jacobowitz (10) Patent No.: US 11,523,680 B2
(45) Date of Patent: Dec. 13, 2022

(54) SLICKER BRUSH HAVING HALO-ILLUMINATED LIGHT

(71) Applicant: A1 Pro Deals, Inc., Brooklyn, NY (US)

(72) Inventor: Naftoli Jacobowitz, New York, NY (US)

(73) Assignee: A1 Pro Deals, Inc., Brooklyn, NY (US)

( * ) Notice: Subject to any disclaimer, the term of this patent is extended or adjusted under 35 U.S.C. 154(b) by 0 days.

(21) Appl. No.: 16/116,703

(22) Filed: Aug. 29, 2018

(65) Prior Publication Data

US 2021/0177131 A1    Jun. 17, 2021

Related U.S. Application Data

(60) Provisional application No. 62/660,953, filed on Apr. 21, 2018.

(51) Int. Cl.
| | |
|---|---|
| *A46B 15/00* | (2006.01) |
| *F21V 3/00* | (2015.01) |
| *F21V 23/04* | (2006.01) |
| *F21V 8/00* | (2006.01) |
| *F21S 9/03* | (2006.01) |
| *A01K 13/00* | (2006.01) |
| *A46B 7/00* | (2006.01) |

(Continued)

(52) U.S. Cl.
CPC ........ *A46B 15/0036* (2013.01); *A01K 13/002* (2013.01); *A46B 7/00* (2013.01); *A46B 9/023* (2013.01); *F21S 9/02* (2013.01); *F21S 9/03* (2013.01); *F21V 3/00* (2013.01); *F21V 23/0414* (2013.01); *F21V 33/0004* (2013.01); *G02B 6/001* (2013.01); *A46B 2200/1093* (2013.01); *F21Y 2115/10* (2016.08)

(58) Field of Classification Search
CPC ....... A46B 15/0036; A46B 7/00; A46B 9/023; A46B 2200/1093; A46B 2200/104; A46B 7/026; F21V 3/00; F21V 23/0414; F21V 33/0004; G02B 6/001; F21S 9/02; F21S 9/03; A01K 13/002; F21Y 2115/10
See application file for complete search history.

(56) References Cited

U.S. PATENT DOCUMENTS

| | | | | |
|---|---|---|---|---|
| 2,397,757 | A * | 4/1946 | Schwedersky | ....... A61N 5/0617 607/79 |
| 6,026,828 | A * | 2/2000 | Altshuler | ........... A46B 15/0002 132/308 |

(Continued)

FOREIGN PATENT DOCUMENTS

| | | | | |
|---|---|---|---|---|
| KR | 1020060007303 | * | 1/2006 | ......... A46B 15/0089 |

OTHER PUBLICATIONS

Park, Hair brush for pets mounted with infrared radiation lamp and suction opening for removing moisture in hairs and dusts during grooming, Jan. 24, 2006, KR 1020060007303, English translation of specification (Year: 2006).*

*Primary Examiner* — Peggy A Neils
(74) *Attorney, Agent, or Firm* — GSLaw LLP (57) ABSTRACT

The present invention offers a halo-illuminating light pattern for clearly showing areas of a pet's fur to the user performing brushing. Such a halo-illuminating light pattern provides a full, 360-degree light pattern of the pet's fur. This eliminates the necessity for using an additional light source, for example a flashlight or being made to settle on a light source that only highlights one side of a pet's fur, leaving another side in shadow.

15 Claims, 10 Drawing Sheets

(51) Int. Cl.
*A46B 9/02* (2006.01)
*F21S 9/02* (2006.01)
*F21V 33/00* (2006.01)
*F21Y 115/10* (2016.01)

(56) References Cited

U.S. PATENT DOCUMENTS

| | | | | |
|---|---|---|---|---|
| 8,591,056 B2* | 11/2013 | Glunz | ............... | A01L 15/00 |
| | | | | 362/119 |
| 8,790,354 B2* | 7/2014 | Makosky | ............ | A61B 17/50 |
| | | | | 606/131 |
| 10,786,072 B1* | 9/2020 | Robinson | ............ | A46B 13/02 |
| 2010/0293731 A1* | 11/2010 | Stief | ............... | A61C 17/222 |
| | | | | 15/106 |
| 2017/0127815 A1* | 5/2017 | Renfro | ............... | A46B 9/06 |
| 2019/0075922 A1* | 3/2019 | Rivera | ............... | A46B 17/08 |

* cited by examiner

SLICKER BRUSH HAVING HALO-ILLUMINATED LIGHT

BACKGROUND

Grooming any mammal whose outer skin is composed of medium to thick fur, such as dogs, has been practiced for hundreds of years. Care of the body surface (COBS) was first performed by the animals themselves. Practice of self-grooming included scratching, nibbling, rubbing, wallowing, and bathing. Self-grooming by the animals was performed for a variety of reasons including re-arrangement of hairs, removal of foreign objects, and sensory stimulation of the skin. To animals, such as dogs, self-grooming was for health reasons, comfort reasons, and appearance purposes to attract a mate.

Following domestication, owners of animals such as dogs perform grooming for their pets. However, as animals continue to require the grooming practices of scratching, nibbling, rubbing, wallowing, and bathing, owners require tools to perform these practices as they lack the implements of rows of canine teeth, claws, and abrasive tongues. A variety of grooming tools present on the marketplace allows owners to provide different practices for animal grooming.

"Pin brushes" are brushes described as having wire pins with protective balls at the end to prevent scratching on the skin. The pins are spaced somewhat wide apart. Pin brushes are useful for dogs having long fur coats. "Rake brushes" are brushes having few but long pins for getting into heavy fur coats. "Bristle brushes" for dogs with short or wiry coats. "Slicker brushes" have a flat, rectangular head and short, wire bristles. The slicker brush is for medium and long hair, and is suitable for removing mats and tangles.

The slicker brush has been shown to be significantly useful in keeping dogs healthy and preened, whether for everyday grooming or for preparation for an event such as a dog show. A key problem with the current slicker brush tools is their requirement of significantly bright environments in an area to perform an adequate job. Without well-lit environments, owners are unable to achieve the full desired effect. However, outside of a parlour, finding fully, well-lit environments is difficult, especially for amateur groomers.

The present invention addresses the problems with the current slicker brush tools on the market by offering a light mechanism that sufficiently illuminates a pet's fur. Whereas there are slicker brushes on the market, they require well-lit environments in order to allow an adequate job of finishing a pet's fur.

The present invention offers a halo-illuminating light pattern for clearly showing areas of a pet's fur to the user performing brushing. Such a halo-illuminating light pattern provides a full, 360-degree light pattern of the pet's fur. This eliminates the necessity for using an additional light source, for example a flashlight or being made to settle on a light source that only highlights one side of a pet's fur, leaving another side in shadow.

BRIEF DESCRIPTION OF THE INVENTION

The present invention relates to a slicker brush device for use on a pet's fur, wherein the slicker brush device delivers a halo-illuminating light effect for an area of a pet's fur, thus providing 360 degree awareness of the performance of the brushing to the user of the device. The present invention thus allows a user to perform a superior finish brushing due to the improvements over slicker brush devices currently being sold in the market.

DETAILED DESCRIPTION

It will be readily understood that the components of the embodiments as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation. The following description is intended only by way of example, and simply illustrates certain example embodiments.

As used herein, the term "illumination" refers to the use of a light source to spotlight a particular area or object. The term "halo-illumination" refers to a light source capable of providing 360 degree light of an area or object at the same time, whereas the light is provided on the periphery of the exuded light, and the center of the light does not provide any light.

Figure 1:
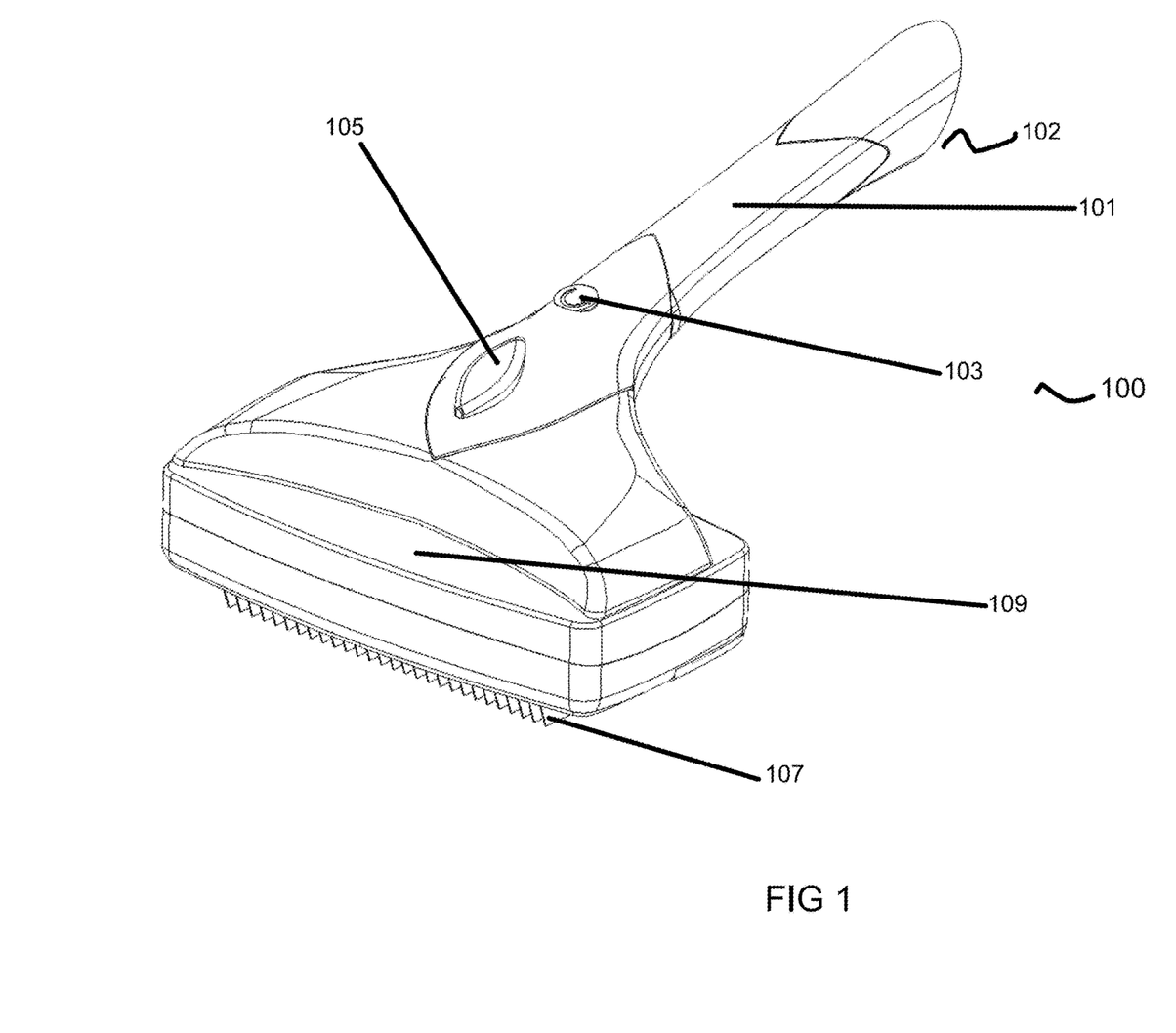
FIG. 1 is an embodiment of the present invention, wherein the slicker brush device includes a light mechanism capable of providing a halo-illuminating light effect on a pet's hair.

With reference to the figures, FIG. 1 is an embodiment of the slicker brush 100 of the present invention, wherein the brush 100 is an elongated-shaped object. The brush 100 can be rectangular, square, or circular shaped. In a preferred embodiment, the brush 100 is rectangular shaped. The brush 100 also includes a handle 102 for managing the brush 100 and bristles 107 for interacting with the pet's fur. The handle 102 may include a grip 101, allowing for even more control in comparison to a non-grip handle, for example a rubber-covered grip.

The brush 100 further includes a bristle button 105 for actuation of the bristles 107 in an up-and-down motion. In the "up" position, the bristles 107 retract into the body of the brush 100. In the "down" position, the bristles 107 are extended beyond the brush 100 to allow interaction with the fur of a pet. As defined by "slicker brush", the bristles 107 are somewhat close together, and are medium in length suitable for pets with medium to thick fur.

The brush 100 further includes a light source having a light diffuser 109. The light diffuser 109 can be defined as a light scattering medium that is placed in the path of a source of lights to reduce the scattering of shadows resulting from the use of light. The diffuser 109 also helps to soften the light.

The brush 100 includes a light source encircling the chamber's interior of the brush 100. As will be discussed later, the light source, when actuated, provides a halo-like illumination effect emanating from the brush 100 to the fur of the pet.

The brush 100 further includes an actuator button 103 for the light source. The actuator button 103, in one embodiment, turns the light source "on" and "off". In another embodiment, the actuator button 103 has multiple settings for the light source, wherein the amount or degree of light delivered by the light source can be 100 percent or full power, 50 percent or medium power, and off or no power.

Figure 2:
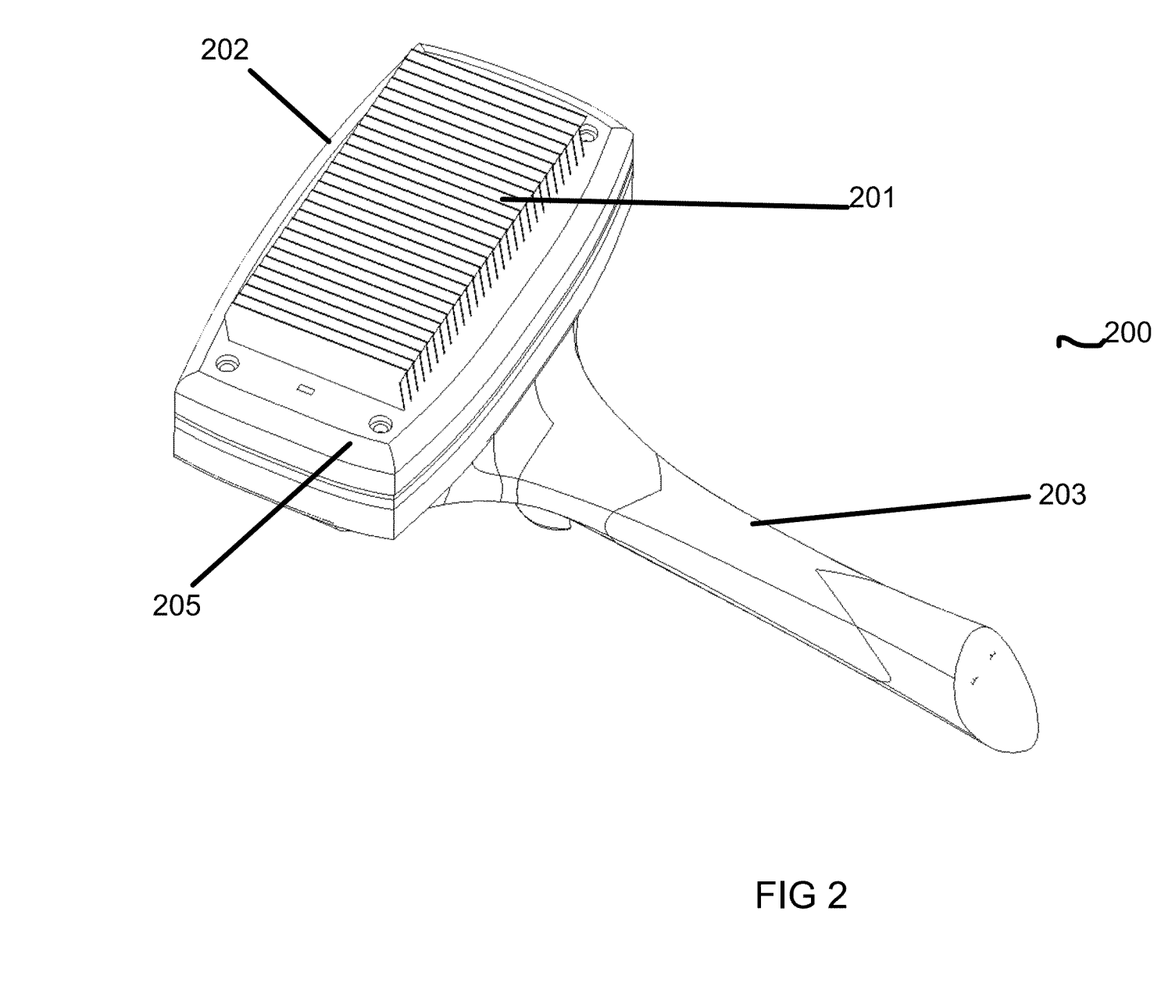
FIG. 2 is the backside embodiment of the present invention.

FIG. 2 is an underside view of the brush 200 of the present invention, including bristles 201, a diffuser for a light source 205, and a handle 203. As shown, the bristles 201 are generally elongated, almost to the full width of the head 202 of the brush 200.

The diffuser for a light source 205 encircles the head 202, allowing light to be directed to sections of a pet's fur below the head 202.

Figure 3:
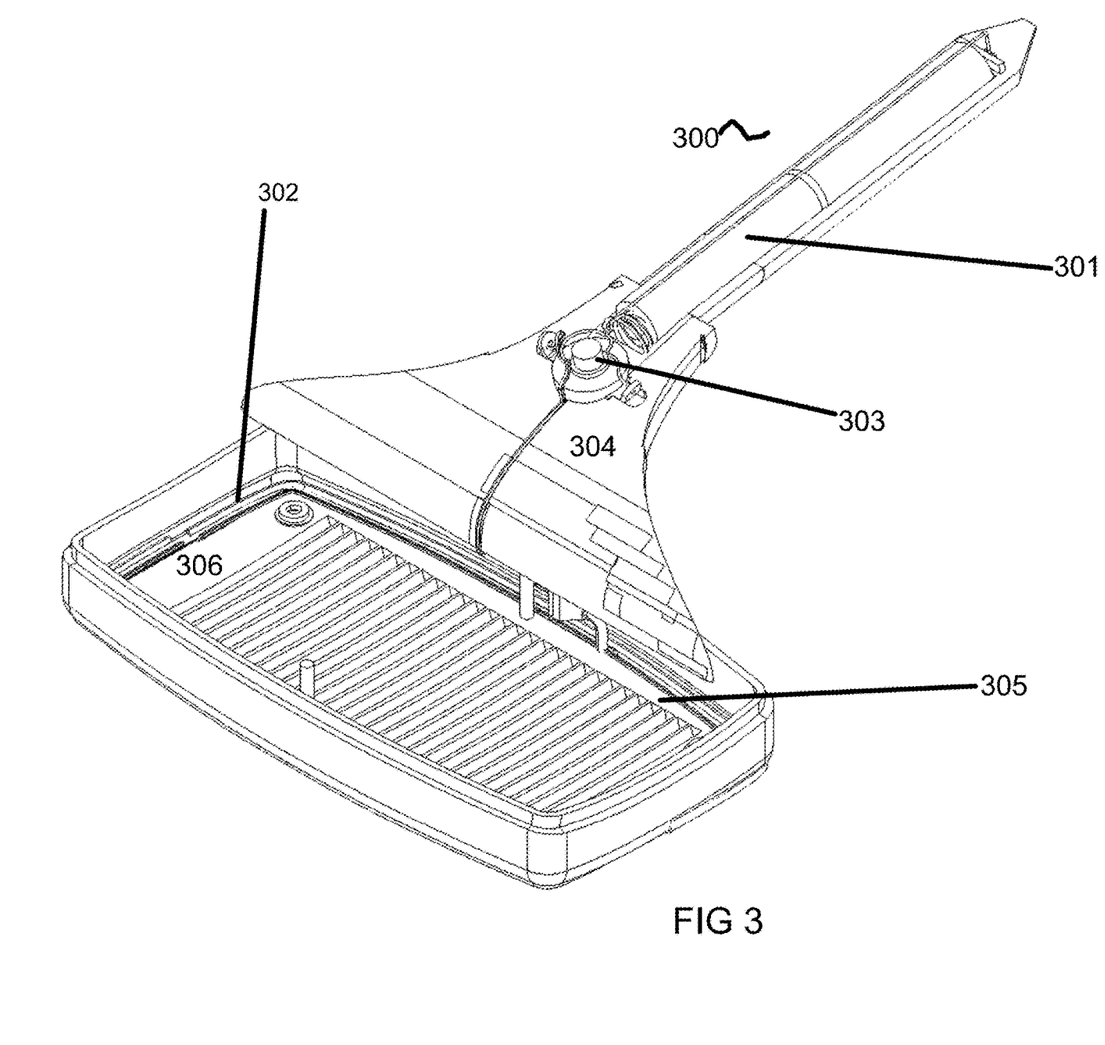
FIG. 3 is an embodiment of the present invention, wherein the halo-illuminating effect of the invention is shown.

FIG. 3 is an embodiment of the device 300 of the present invention. FIG. 3 presents an internal view of the device 300, including a power source 301 for the light source, the actuator button 303 that completes the circuit between power source 301 and light source, the mid-portion 304 between the head 306 and the handle, and a light chamber 305 having a light source.

As will be described later, the light source, in one embodiment, can be a light rope such as a fiber optic tube. By encircling the head 306, the light source is capable of providing halo-illuminating light technique. The halo-illuminating light technique provides 360 degree light around the brush during its use, i.e., combing the pet's fur. Using the present invention, a user will be able to sufficiently illuminate areas of the pet's fur where the user may be combing the pet. The light source that provides the halo-illuminating effect can be a light-emitting diode (LED), incandescent light bulb, and the like. The light source 302 can be a white light or a blue light. In a preferred embodiment, the light source is a poly(methyl methacrylate) fiber optic tube.

The device further includes a power source 301 for powering the light source. The power source can include one or more batteries, including disposable batteries or rechargeable batteries.

Rechargeable batteries are useful for accepting a charge and discharging a charge. In accepting a charge, the battery possesses means to be connected to a mains power supply, as well as possessing means to obtain a solar charge, such as by solar cell. In discharging a charge, the battery through intermediate connection means provides a charge to the light source of the device.

The batteries can be lithium ion, nickel-metal, nickel-cadmium, lead-acid, magnesium batteries, lithium polymer, and other types of rechargeable batteries.

The batteries may number from one to several, based on the desired output charge, defined in terms of mAh which is the amount of power flow that is supplied at a specific voltage to an electrically driven device. Recharging and/or driving may occur while the batteries themselves are being recharged, either from a mains supply source, or via a solar cell.

Figure 4:
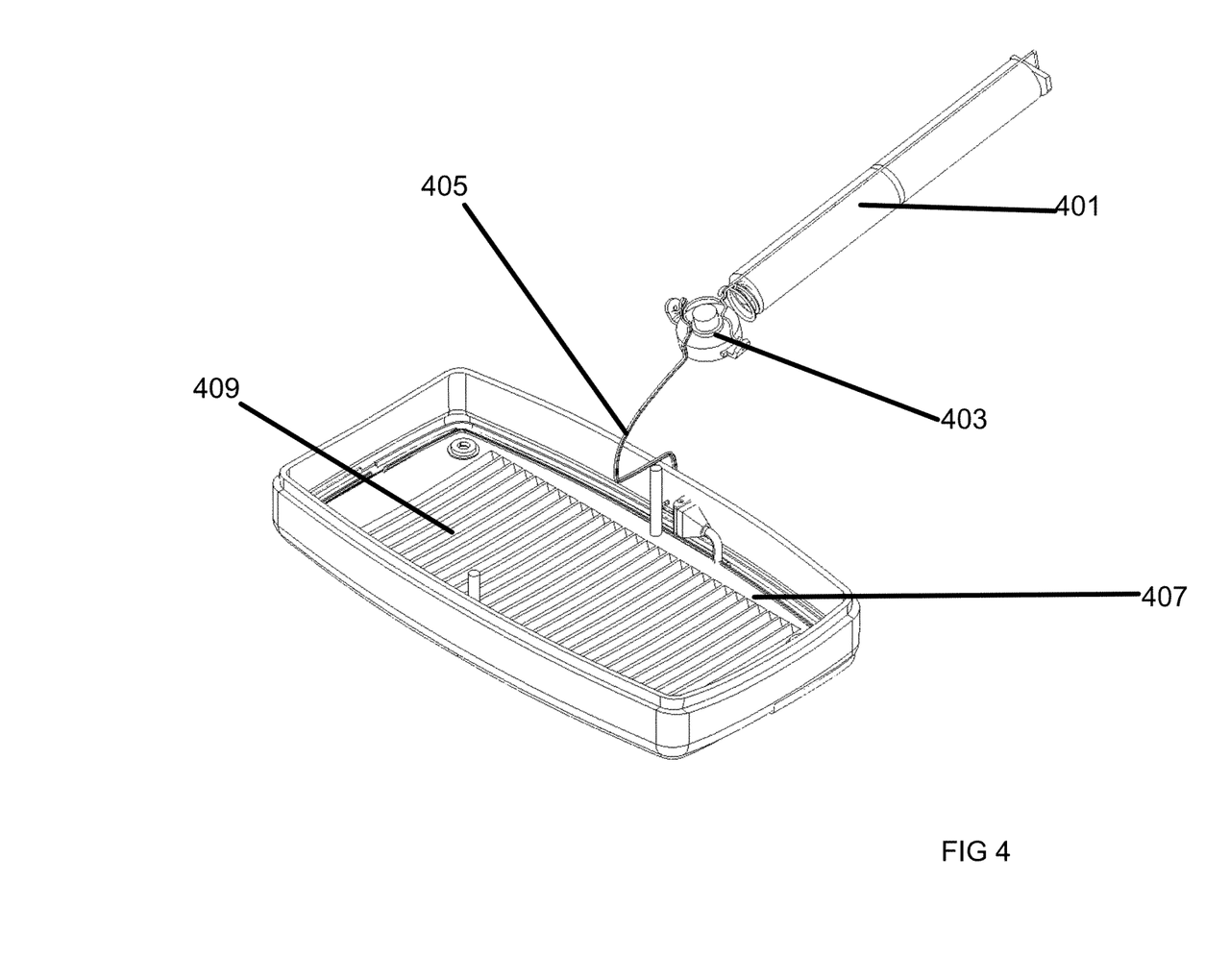
FIG. 4 is an embodiment of the present invention, wherein an exploded view of the device is shown.

FIG. 4 is an embodiment of the present invention, wherein an exploded view of the device is shown. Evident is the power source 401, which can be batteries (as described above), an actuator button 403 to turn on and off the light source, a light chamber 407 which holds the light source, and bristles 409.

Figure 5:
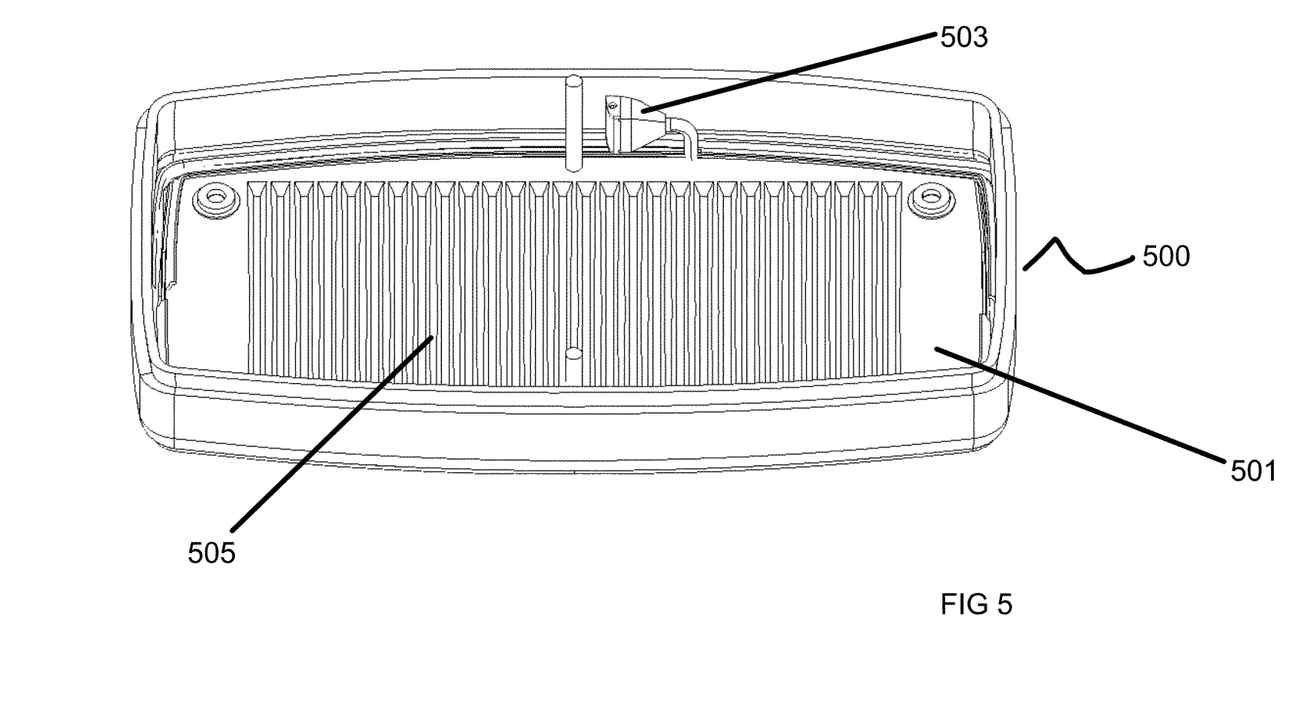
FIG. 5 is an embodiment of the head of the device of the present invention.

FIG. 5 is an embodiment of the head 500 of the slicker brush device of the present invention. Within the head 500 is a chamber 501 which holds the light source, bristles 505, and a power connector 503 connecting the light source to the actuator button (not shown).

Figure 6:
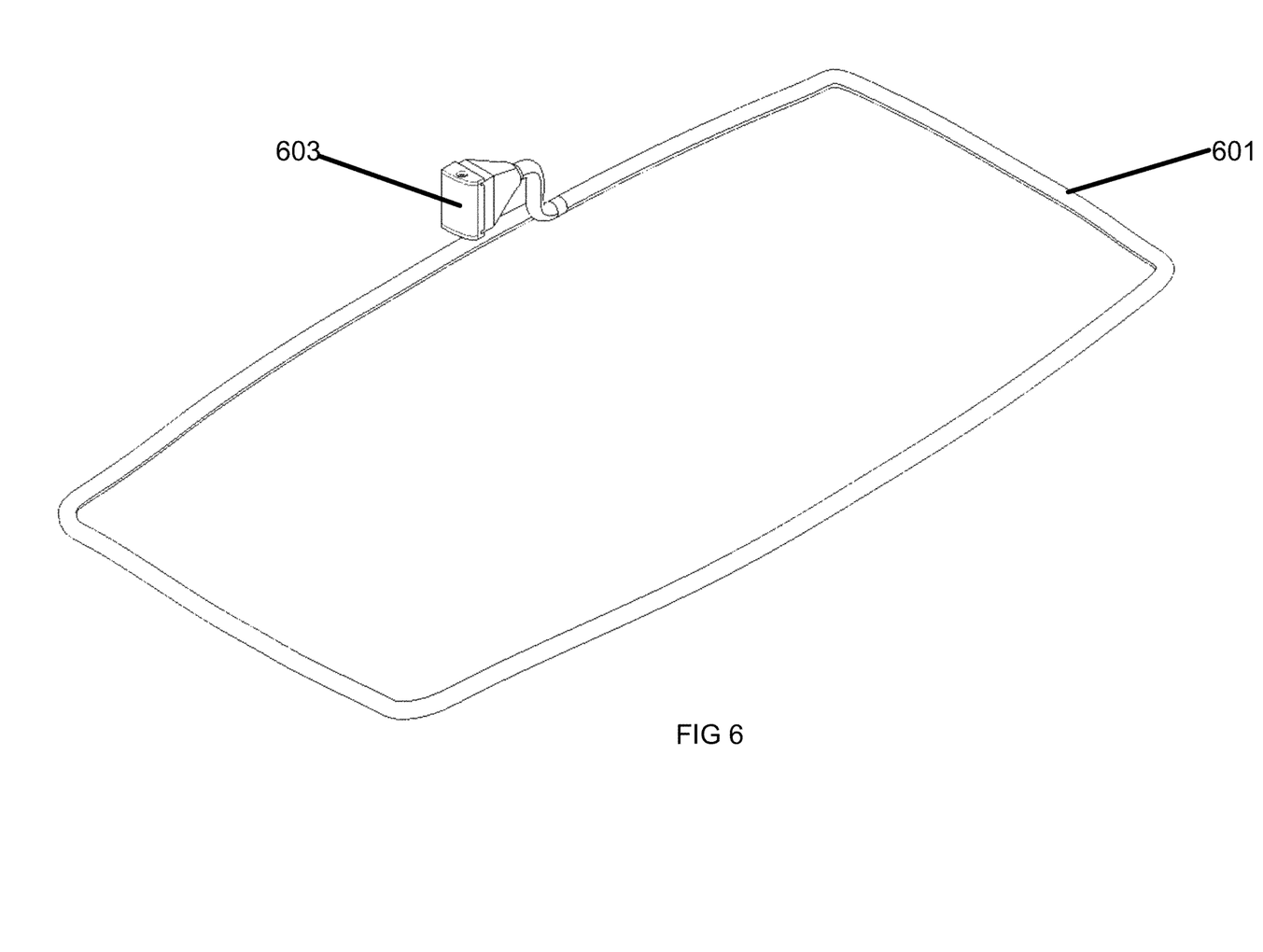
FIG. 6 is an embodiment of the light source of the present invention.

FIG. 6 is an embodiment of the light source 601 that will be present within the chamber of the head of the slicker brush device. The light source 601 is preferably circular, allowing it to encircle the head. By encircling the head, the light source 601 can provide a halo-illumination effect. The light source 601 includes a connector 603, which attaches the light source 601 to the actuator button (not shown). When in use, the actuator button completes the circuit between the power source (not shown) to the connector 603.

Figure 7:
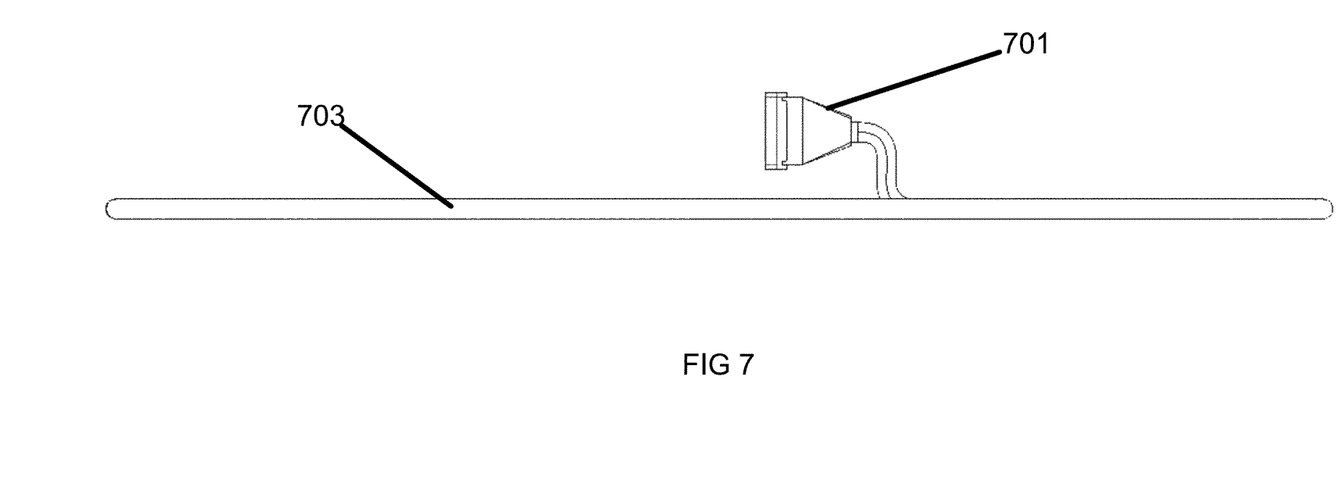
FIG. 7 is an embodiment of the light source of the present invention.

FIG. 7 is a side view of the light source 703, which includes the connector 701. The light source 703 is generally from 1 mm to 4 mm in thickness.

Figure 8:
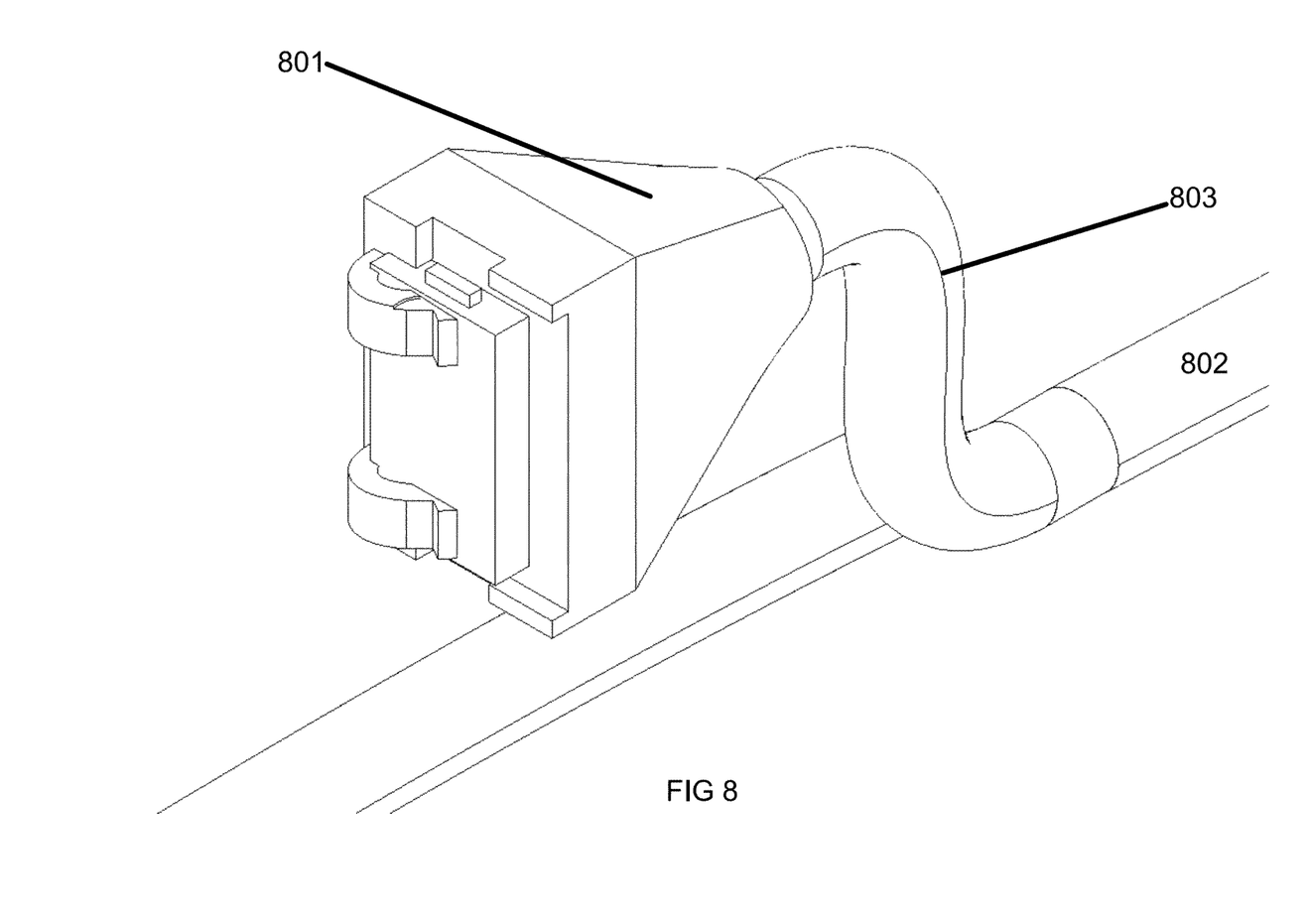
FIG. 8 is an embodiment of the connector for the light source of the device of the present invention.

FIG. 8 is an enlarged view of the connector 801 of the light source 802. The connector 801 generally possess a bend 803 such that it fits accommodatingly within the chamber (not shown).

Figure 9:
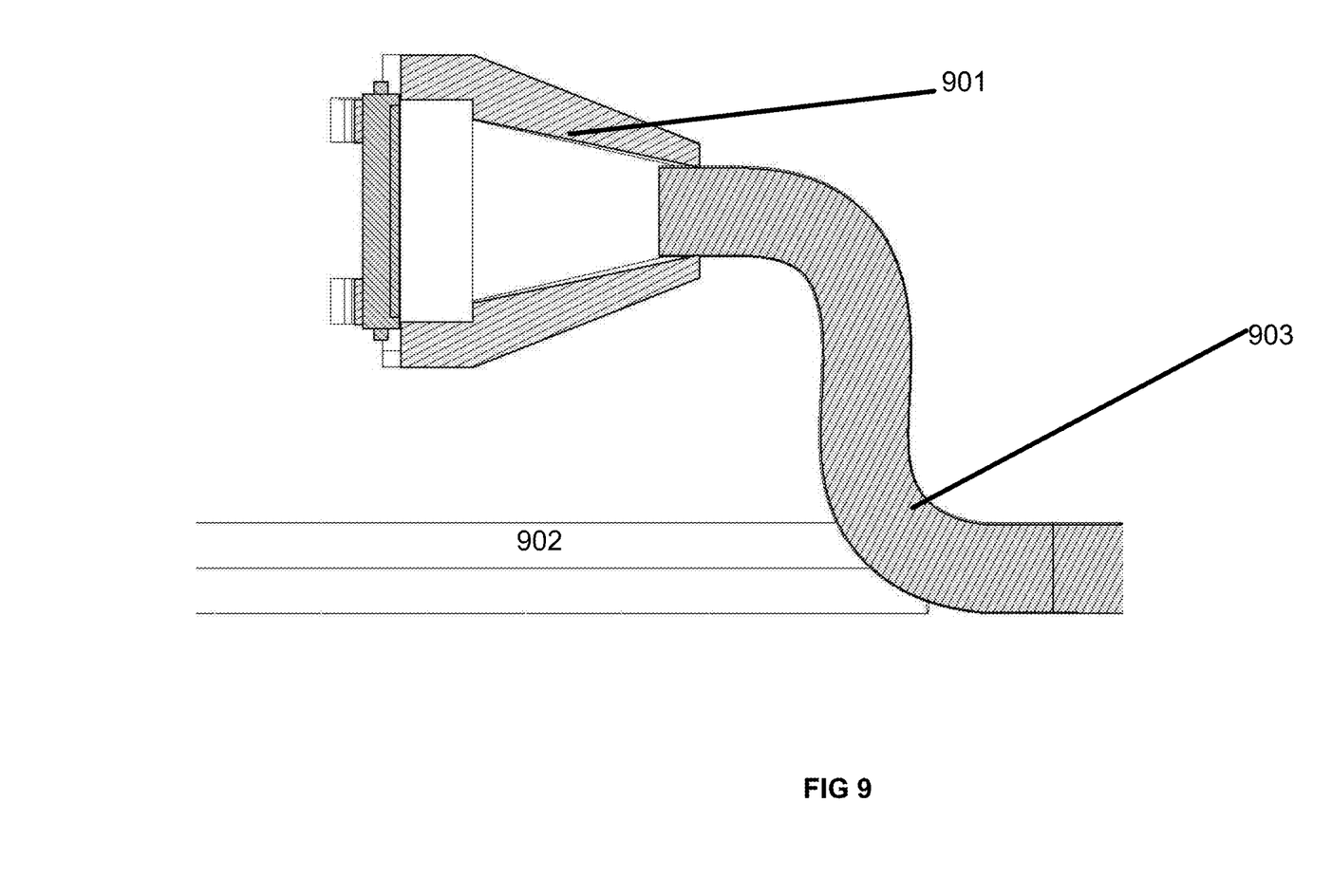
FIG. 9 is an embodiment of the connector for the light source of the device of the present invention.

FIG. 9 is an enlarged side view of the connector 901 of the light source 902. The connector 901 generally possesses a bend 903 such that it fits accommodatingly within the chamber (not shown).

Figure 10:
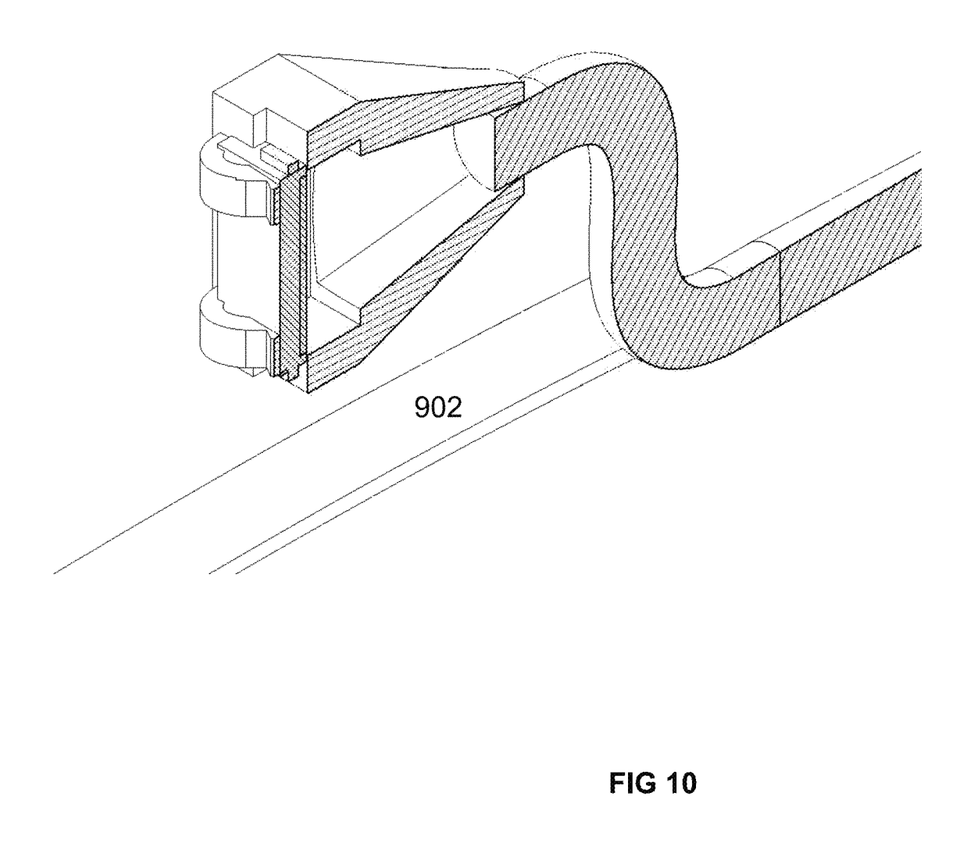
FIG. 10 is an embodiment of the connector for the light source of the device of the present invention.

FIG. 10 is a enlarged perspective view of the connector 901 of the light source 902.

Although various embodiments of the present invention have been shown and described, modifications may occur to those skilled in the art upon reading the specification. The present invention includes such modifications and is limited only by the scope of the claims.

I claim:

1. A slicker brush, comprised of:
   a head;
   a mid-portion extending from the head;
   a handle extending from the mid-portion away from the head;
   a set of bristles associated with said head, wherein said bristles are retractable;
   a chamber within said head;
   a light source positioned within said chamber such that said light source encircles said chamber and extends around the set of bristles, the light source configured to emit visible light from the chamber;
   a light diffuser configured to emit the visible light from the head;

an actuator for actuating said light source; and
a power source for powering said light source.

2. The slicker brush of claim 1, wherein said light source is a light rope.

3. The slicker brush of claim 2, wherein said light rope is a fiber optic tube.

4. The slicker brush of claim 1, wherein said light source is comprised of light emitting diodes.

5. The slicker brush of claim 3, wherein said fiber optic tube is made of poly(methyl methacrylate).

6. The slicker brush of claim 1, further comprising a bristle actuator for retracting said bristles.

7. The slicker brush of claim 1, wherein said bristles are an elongated row of teeth, said teeth spanning the width of said head of said brush.

8. The slicker brush of claim 1, wherein said power source is a battery.

9. The slicker brush of claim 8, wherein said battery is selected from the group consisting of one or more disposable batteries or one or more rechargeable batteries.

10. The slicker brush of claim 9, wherein said rechargeable battery is rechargeable by a mains power supply or a solar charge.

11. The slicker brush of claim 5, wherein the diameter of said tube ranges from about 1 mm to 4 mm.

12. The slicker brush of claim 1, wherein said light source further comprises a connector.

13. The method of detangling a mammal's fur, comprising the steps of:
    dropping bristles from a chamber within the head of a slicker brush by means of a first actuator;
    emitting visible light from a light source stored within said head of said slicker brush by means of a second actuator;
    creating a halo-illumination over a portion of said mammal's hair or fur by emitting the visible light from a ring-shaped area that extends around the bristles; and
    combing said mammal's hair or fur with said slicker brush.

14. The slicker brush of claim 1, wherein the light source extends around an interior of the chamber.

15. The slicker brush of claim 1, wherein the light source and the light diffuser are configured to emit light from a band-shaped area that extends around the set of bristles.

* * * * *